United States Patent
Sugama

(10) Patent No.: US 8,212,815 B2
(45) Date of Patent: Jul. 3, 2012

(54) DRAWING APPARATUS, DRAWING PROGRAM, AND DRAWING METHOD

(75) Inventor: Yasushi Sugama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 846 days.

(21) Appl. No.: 12/268,796

(22) Filed: Nov. 11, 2008

(65) Prior Publication Data

US 2009/0141025 A1 Jun. 4, 2009

(30) Foreign Application Priority Data

Nov. 30, 2007 (JP) ................................. 2007-311185

(51) Int. Cl.
*G06T 17/00* (2006.01)
(52) U.S. Cl. ....................................... 345/424; 345/419
(58) Field of Classification Search .................. 345/424, 345/419
See application file for complete search history.

(56) References Cited

U.S. PATENT DOCUMENTS

| | | | |
|---|---|---|---|
| 2003/0201994 A1* | 10/2003 | Taylor et al. .................. | 345/581 |
| 2004/0119709 A1 | 6/2004 | Strom et al. | |
| 2005/0134583 A1* | 6/2005 | Kokojima et al. ............ | 345/419 |
| 2006/0044317 A1 | 3/2006 | Bourd et al. | |

FOREIGN PATENT DOCUMENTS

| | | |
|---|---|---|
| JP | 2001-283242 | 10/2001 |
| JP | 2005-182547 | 7/2005 |
| JP | 2006-510973 | 3/2006 |

OTHER PUBLICATIONS

Japanese Office Action mailed Dec. 15, 2009 in related Japanese Application, 2 pages (2 pages English Translation).
Japanese Office Action mailed Mar. 23, 2010 in related Japanese Application, 2 pages (2 pages English translation).

* cited by examiner

*Primary Examiner* — Maurice L McDowell, Jr.
(74) *Attorney, Agent, or Firm* — Staas & Halsey LLP

(57) ABSTRACT

A drawing apparatus has dividing unit for dividing a rectangle frame circumscribing a triangle displayed on a display screen into a plurality of rectangle segments. A determining unit sequentially determines whether each rectangle segment included in the rectangle frame overlaps the triangle in a predetermined direction and outputs a determination result of overlap or nonoverlap. The sequential determination of overlap or nonoverlap is stopped in the predetermined direction, if a determination result output from the determining unit changes from the overlap to the nonoverlap. A drawing process is performed on the rectangle segment determined to overlap the triangle.

19 Claims, 10 Drawing Sheets

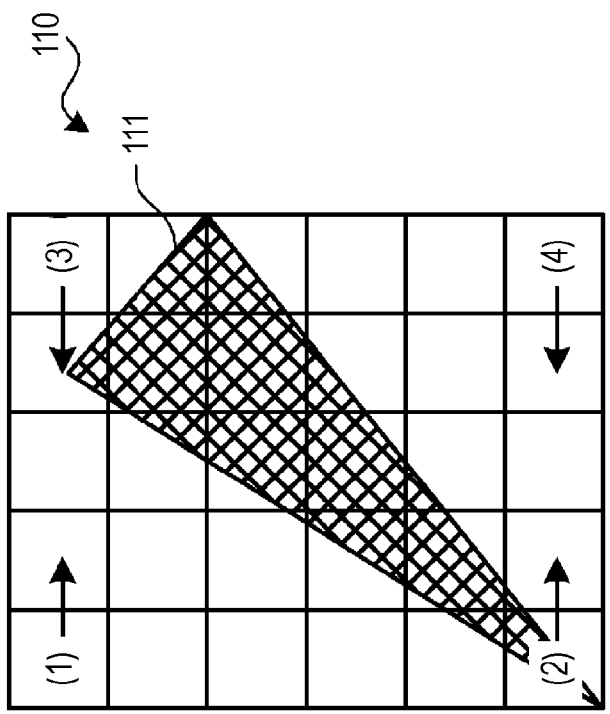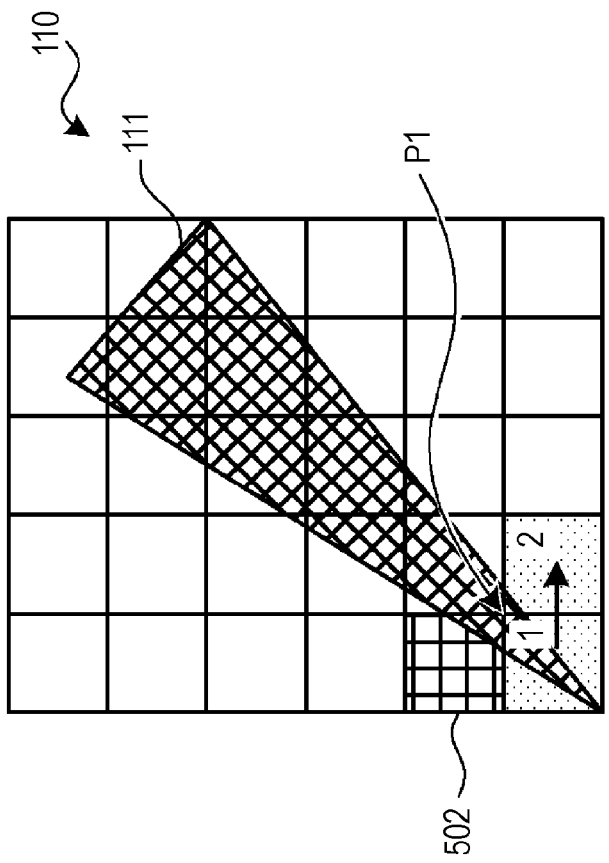

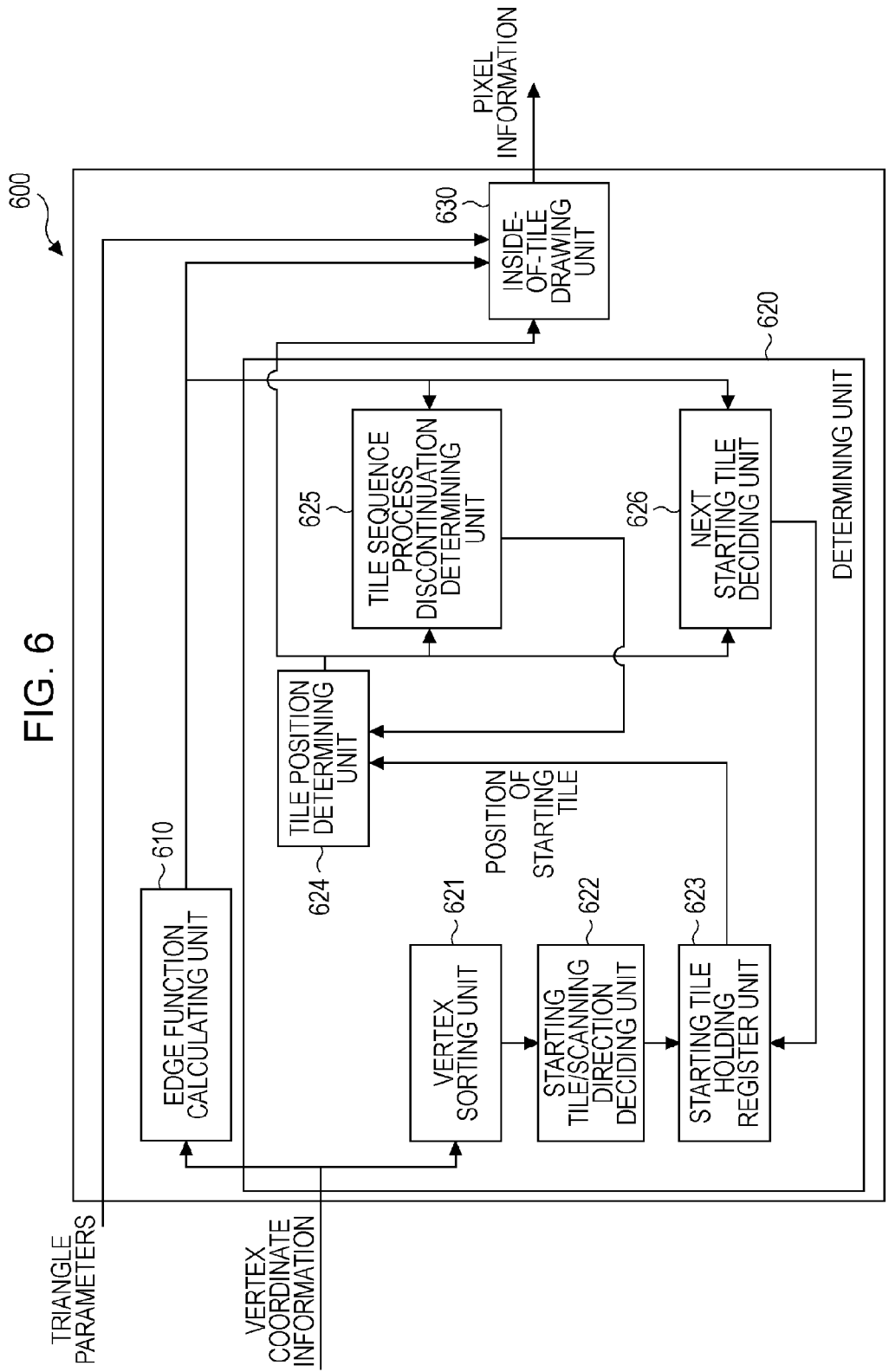

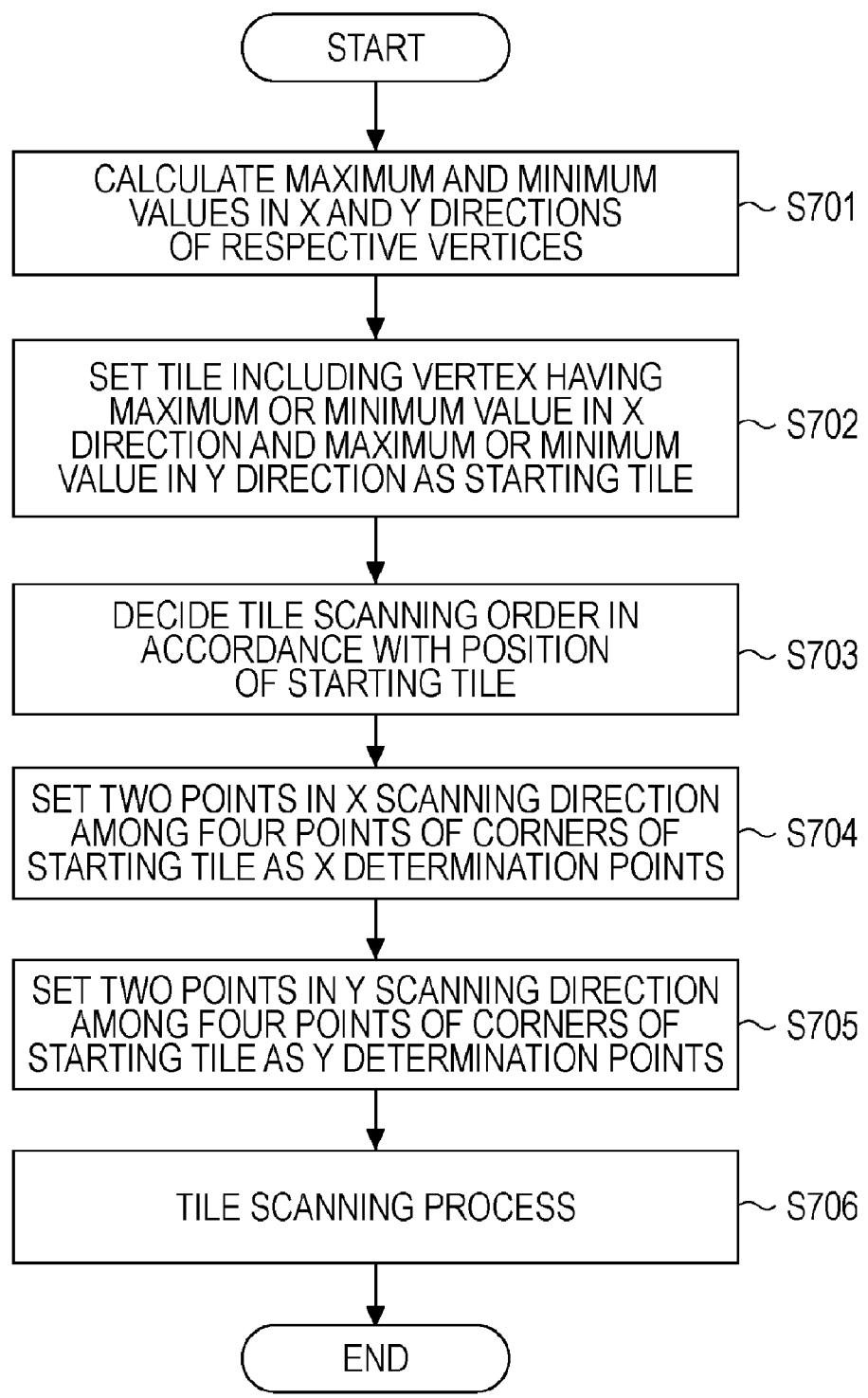

DRAWING APPARATUS, DRAWING PROGRAM, AND DRAWING METHOD

CROSS-REFERENCE TO RELATED APPLICATIONS

This application is based upon and claims the benefit of prior from Japanese application No. 2007-311185 filed on Nov. 30, 2007 the entirety of which is incorporated herein by reference.

BACKGROUND

1. Field

The present invention relates to a drawing apparatus, a drawing program, and a drawing method to draw an image by using a polygon including a triangle.

2. Description of the Related Art

Conventionally, a drawing process, for example a three-dimensional drawing process of drawing a three-dimensional figure, by using a polygon has been known. In this drawing process, a display screen is divided into a plurality of rectangle segments called tiles, and a rasterizing process is performed on each of the tiles. The rasterizing process is a process of drawing a figure by filling the inside of respective vertices of a triangle constituting the figure.

When a display screen is divided into a plurality of tiles, a rectangle circumscribing a triangle is set on the basis of information of vertices of the triangle, and a drawing process is performed on each of tiles existing in the rectangle. In this method, the drawing process is performed also in an area where pixels of the triangle do not actually exist. Japanese Unexamined Patent Application Publication No. 2001-283242 discloses a drawing apparatus to determine whether a triangle to be drawn is included in each tile before a rasterizing process and perform the rasterizing process on only the tiles including the triangle with reference to the determination result.

According to this technique, in the case where a drawing process is performed on only the tiles as a drawing target, a determining process needs to be performed on all tiles to determine whether each of the tiles is a drawing target, in order to specify the tiles as a drawing target.

SUMMARY

According to an aspect of this invention, a drawing apparatus has dividing unit for dividing a rectangle frame circumscribing a triangle displayed on a display screen into a plurality of rectangle segments, determining unit for sequentially performing a determining process of determining whether each rectangle segment included in the rectangle frame overlaps the triangle in a predetermined direction and outputting a determination result of overlap or nonoverlap, control unit for ending the determining process in the predetermined direction if the determination result output from the determining unit changes from the overlap to the nonoverlap, and drawing unit for performing a drawing process on the rectangle segments determined to overlap the triangle by the determining unit.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 5A to 5F illustrate a tile determining operation in a tile scanning process;

FIG. 6 is a block diagram of the drawing apparatus according to the embodiment;

FIG. 7 is a flowchart illustrating a procedure of the drawing process according to the embodiment.

DETAILED DESCRIPTION OF THE PREFERRED EMBODIMENTS

Figure 1:
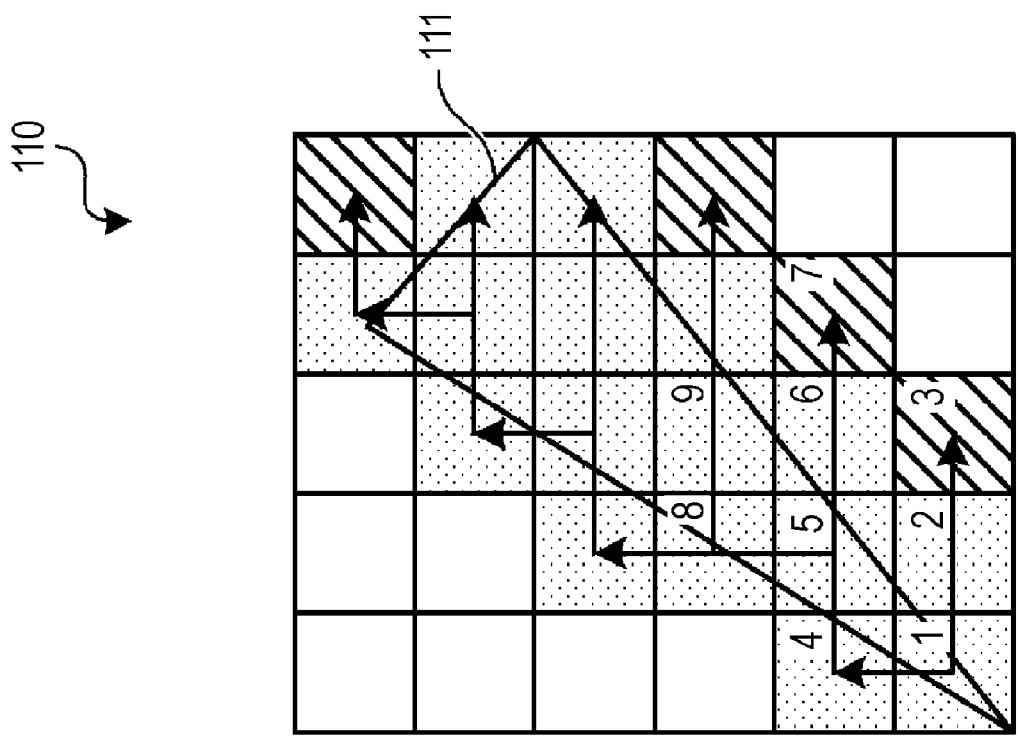
FIG. 1 illustrates a drawing process according to an embodiment.

In a drawing process according to an embodiment, the part serving as a drawing target is determined before the drawing process. Then, the drawing process is performed on only the part determined to be the drawing target. In this method, a process of determining a drawing target can be performed on a minimum part.

FIG. 1 is an illustration of an outline of the drawing process according to the embodiment. After a triangle 111 to be drawn on a display screen has been specified, a rectangle area 110 circumscribing the triangle 111 is set and is divided into rectangle segments. In this case, the rectangle area 110 is divided into 30 rectangle segments: 6 segments in the vertical direction and 5 segments in the horizontal direction.

In the drawing process according to the embodiment, a determining process is started after a starting rectangle segment has been set. The starting segment is rectangle segment 1 including a vertex of the triangle among the rectangle segments positioned at four corners of the rectangle 110 circumscribing the triangle 111. After rectangle segment 1 has been set as a starting segment, a determining process is sequentially performed on rectangle segments adjacent in the horizontal direction, starting from rectangle segment 1. The processing direction of target tile groups may be horizontal (right or left), vertical (up and down), or diagonal, or any combinations thereof, and the direction where an adjacent rectangle segment exists is regarded as a processing direction.

As described above, the determining process is sequentially performed on rectangle segments 2 and 3 in the right direction. If a determined rectangle segment does not overlap the triangle 111, the determining process is not performed any more in the right direction, namely processing is stopped at rectangle segment 3 (illustrated by hashed lines in FIG. 1).

The determining process is performed on rectangle segment 4 adjacent in the vertical direction to rectangle segment 1 in order to determine whether rectangle segment 4 overlaps the triangle 111. For example, the upward direction where adjacent rectangle segment 4 exists is regarded as the processing direction. As in this case where rectangle segment 4 overlaps the triangle 111, the determining process is performed in the right direction from rectangle segment 4.

By using rectangle segment 4 as the reference, the determining process is performed in the right direction and the upward direction. In the right direction, the determining process is performed until rectangle segment 7. The rectangle segment adjacent in the upward direction to rectangle segment 4 does not overlap the triangle 111.

In the case where the rectangle segment adjacent in the upward direction does not overlap the triangle 111, the determining process is performed in the right direction from rectangle segment 8, which is a first rectangle segment overlapping the triangle among the rectangle segments adjacent in the upward direction to rectangle segment 5, which is adjacent in the right direction to rectangle segment 4.

The above-described process is performed repeatedly until there is no rectangle segment adjacent in the upward direction. After the determining process ends, a drawing process is performed on each rectangle segment with reference to the determination result. The timing to start the drawing process on a target drawing tile is not limited to the timing when the entire determining process ends. Alternatively, the drawing process may be sequentially started from the rectangle segment determined to overlap the triangle, that is, the drawing process may be performed in parallel with the determining process.

Such a determining process enables enhancement of a processing speed of the entire drawing process.

Figure 2:
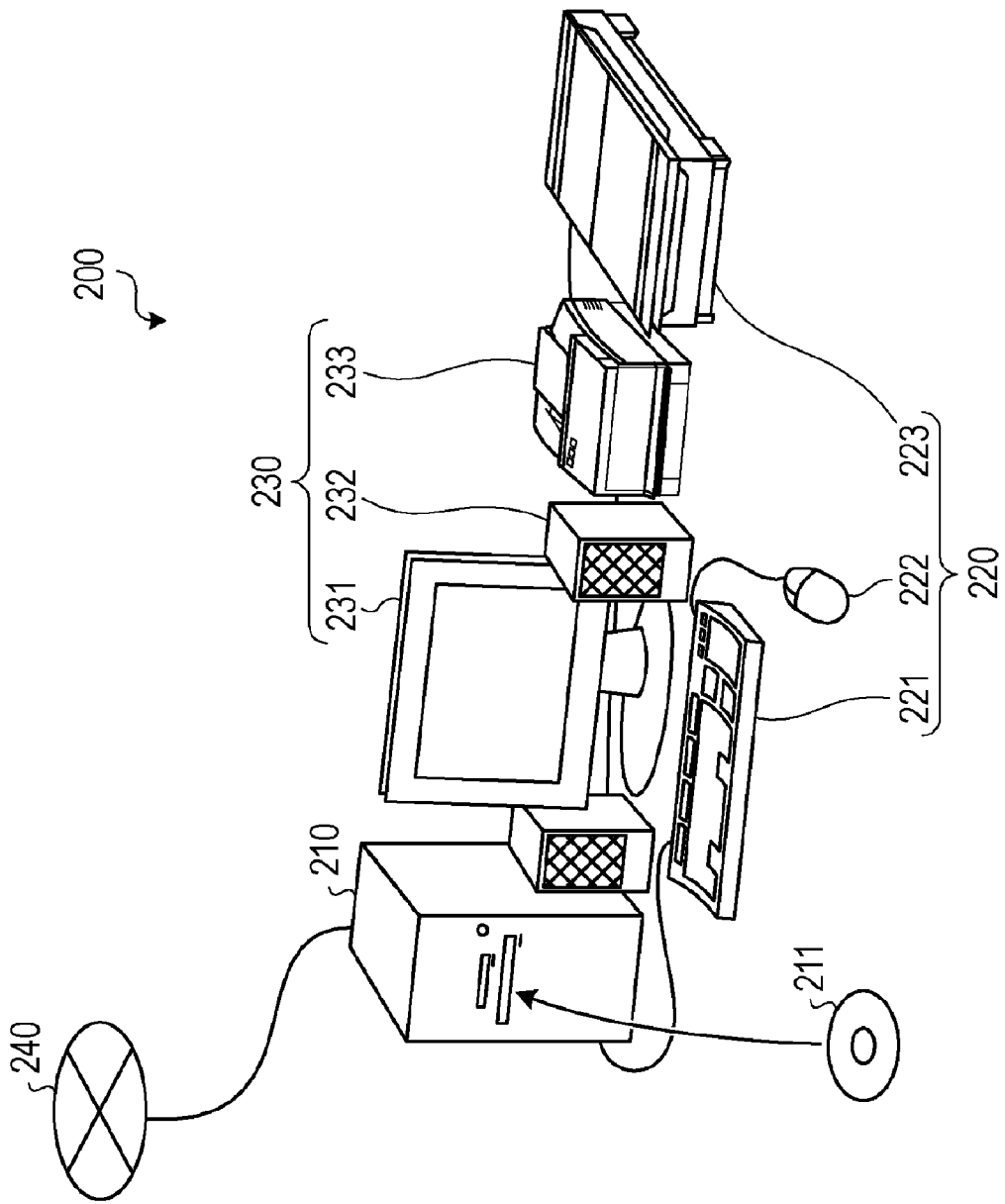
FIG. 2 illustrates a hardware configuration of a drawing apparatus according to the embodiment.

FIG. 2 is an illustration of a hardware configuration of a drawing apparatus according to the embodiment of the present invention.

Referring to FIG. 2, the drawing apparatus 200 includes a computer main body 210, an input device 220, and an output device 230. The drawing apparatus 200 can be coupled to a network 240, such as a local area network (LAN), a wide area network (WAN), and the Internet, via a router or a modem.

The computer main body 210 includes a central processing unit (CPU) (e.g., hardware logic circuitry based computer processor that processes instructions, namely software), a memory, and an interface. The CPU controls the entire drawing apparatus 200. The memory includes a read only memory (ROM), a random access memory (RAM), an hard disk (HD), an optical disc 211, and a flash memory. The memory is used as a work area of the CPU.

The memory stores various programs, each of which is loaded in response to a command from the CPU. The various programs include an input/output program to control input/output of the computer main body 210 and a drawing program allowing the CPU to perform a drawing process. In the HD and the optical disc 211, read/write of data is controlled by a disk drive. The optical disc 211 and the flash memory are loadable to and removable from the computer main body 210. The interface controls input from the input device 220, output to the output device 230, and transmission/reception to/from the network 240.

The input device 220 includes a keyboard 221, a mouse 222, and a scanner 223. The keyboard 221 has keys to input characters, numerics, and various instructions, and is used to input data. A touch panel system may also be adopted. The mouse 222 is used to move a cursor, select a range, move a window, and change a size. The scanner 223 optically reads an image. The read image is captured as image data and is stored in the memory in the computer main body 210. The scanner 223 may have an optical character reader (OCR) function.

The output device 230 includes a display 231, a speaker 232, and a printer 233. The display 231 displays a cursor and icons or tool boxes, and also displays data including documents, images, and functional information. When the above-described drawing program is being executed, the display 231 displays a three-dimensional figure drawn by the drawing program. The speaker 232 outputs sound effects and reading voices. The printer 233 prints image data and document data, such as a three-dimensional image drawn by the drawing program.

Figure 3:
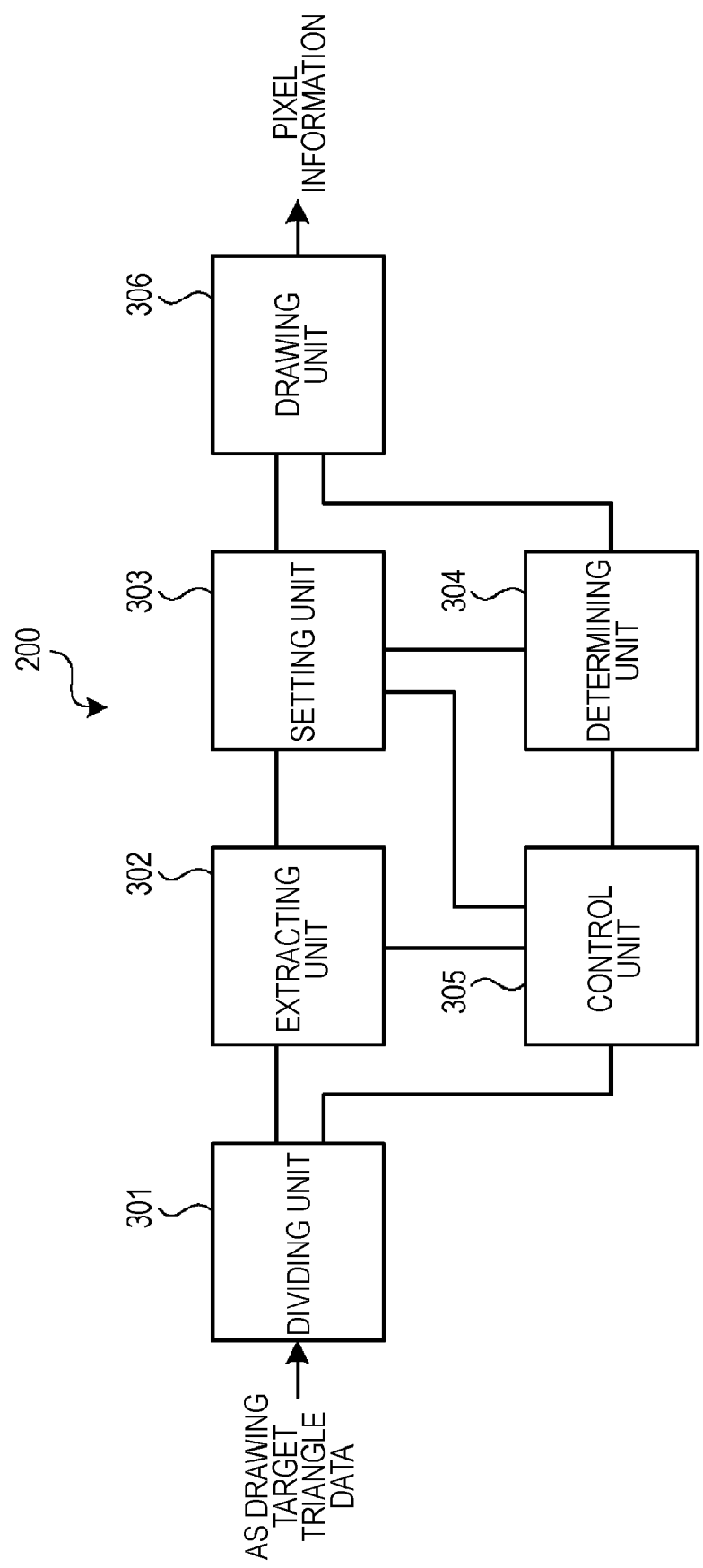
FIG. 3 is a block diagram of the drawing apparatus according to the embodiment.

FIG. 3 is a block diagram illustrating the drawing apparatus according to the embodiment. As illustrated in FIG. 3, the drawing apparatus 200 includes a dividing unit 301, an extracting unit 302, a setting unit 303, a determining unit 304, a control unit 305, and a drawing unit 306. The functions corresponding to the respective units 301 to 306 can be realized by allowing the CPU to execute the program related to the units 301 to 306 stored in the storage unit of the drawing apparatus 200 or by the input/output interface.

The dividing unit 301 divides a rectangle circumscribing vertices of a triangle into a group of rectangle segments. The group of rectangle segments is generated by dividing a rectangle circumscribing vertices of a triangle into a plurality of small rectangles. The dividing unit 301 may set a group of rectangle segments in units of pixel blocks of the display 231 and may perform division into such rectangle segments. Furthermore, the dividing unit 301 may set a rectangle having sides parallel to a scanning direction of the display 231 and may divide the rectangle into a group of rectangle segments.

The extracting unit 302 extracts rectangle segments including a vertex of a triangle from the rectangle segments generated through division by the dividing unit 301. Various methods can be used to extract a vertex of a triangle. For example, the following method can be used. That is, vertices coordinates of the triangle are obtained, a vertex having maximum or minimum x and y values of the vertices coordinates is detected, and the rectangle segment including the detected vertex is extracted as a rectangle segment including a vertex of the triangle.

The setting unit 303 sets, as a starting segment, a rectangle segment including a corner of the rectangle circumscribing the triangle among the rectangle segments extracted by the extracting unit 302. According to an aspect of an embodiment, the starting segment is a rectangle segment including a vertex of the triangle from among the rectangle segments positioned at four corners of the rectangle circumscribing the triangle. Also, the setting unit 303 performs, by the determining unit 304 described below, a determining process of determining whether rectangle segments adjacent to a series of rectangle segments arranged in a direction orthogonal to a predetermined direction overlap a drawing area of the triangle, sequentially from the starting segment.

The determining unit 304 performs a determining process of determining whether rectangle segments adjacent in the predetermined direction to a series of rectangle segments arranged in the predetermined direction in a specified group of rectangle segments overlap the drawing area of the triangle. The specified group of rectangle segments is a group of rectangle segments having the starting segment set by the setting unit 303 at its head. That is, the determining process is sequentially performed from the starting segment.

The control unit 305 controls the determining unit 304 and so as to end the determining process on the series of rectangle segments when the determination result obtained through the determining process changes from overlap to nonoverlap. Also, the control unit 305 controls the determining unit 304 so as to allow the determining unit 304 to perform a determining process of determining whether rectangle segments adjacent in a direction orthogonal to the predetermined direction to the rectangle segments that have been determined to overlap the drawing area of the triangle overlap the drawing area of the triangle. In this determining process, too, the control unit 305 ends the determining process on the series of rectangle segments when the determination result changes from overlap to nonoverlap.

Assume that the predetermined direction is an x direction and that the direction orthogonal to the predetermined direction is a y direction. In this case, the control unit 305 ends the determining process on a series of rectangle segments arranged in the x direction when the determination result changes from overlap to nonoverlap. Also, the control unit 305 sequentially performs the determining process on rectangle segments adjacent in the y direction to each other from the rectangle segments that have been determined to overlap the triangle in the determining process performed on the rectangle segments in the x direction. In this case, too, the control unit 305 ends the determining process on the series of rectangle segments arranged in the y direction when the determination result changes from overlap to nonoverlap.

After ending the determining process on the series of rectangle segments arranged in the predetermined direction from the starting segment until there are no triangle overlapping rectangle segments, the control unit 305 starts a determining process on a series of rectangle segments arranged in the predetermined direction from a next starting segment that is set by the setting unit 303. If the next starting segment can not be set by the setting unit 303, the control unit 305 ends the determining process on the rectangle as a target of a drawing process after ending the determining process on the series of rectangle segments arranged in the predetermined direction from the starting segment.

The drawing unit 306 performs a drawing process on only the starting segment set by the setting unit 303 and the rectangle segments determined to overlap the drawing area of the triangle by the control unit 305. The drawing process performed here is a rasterizing process. Also, another type of drawing process may be applied.

Figure 4:
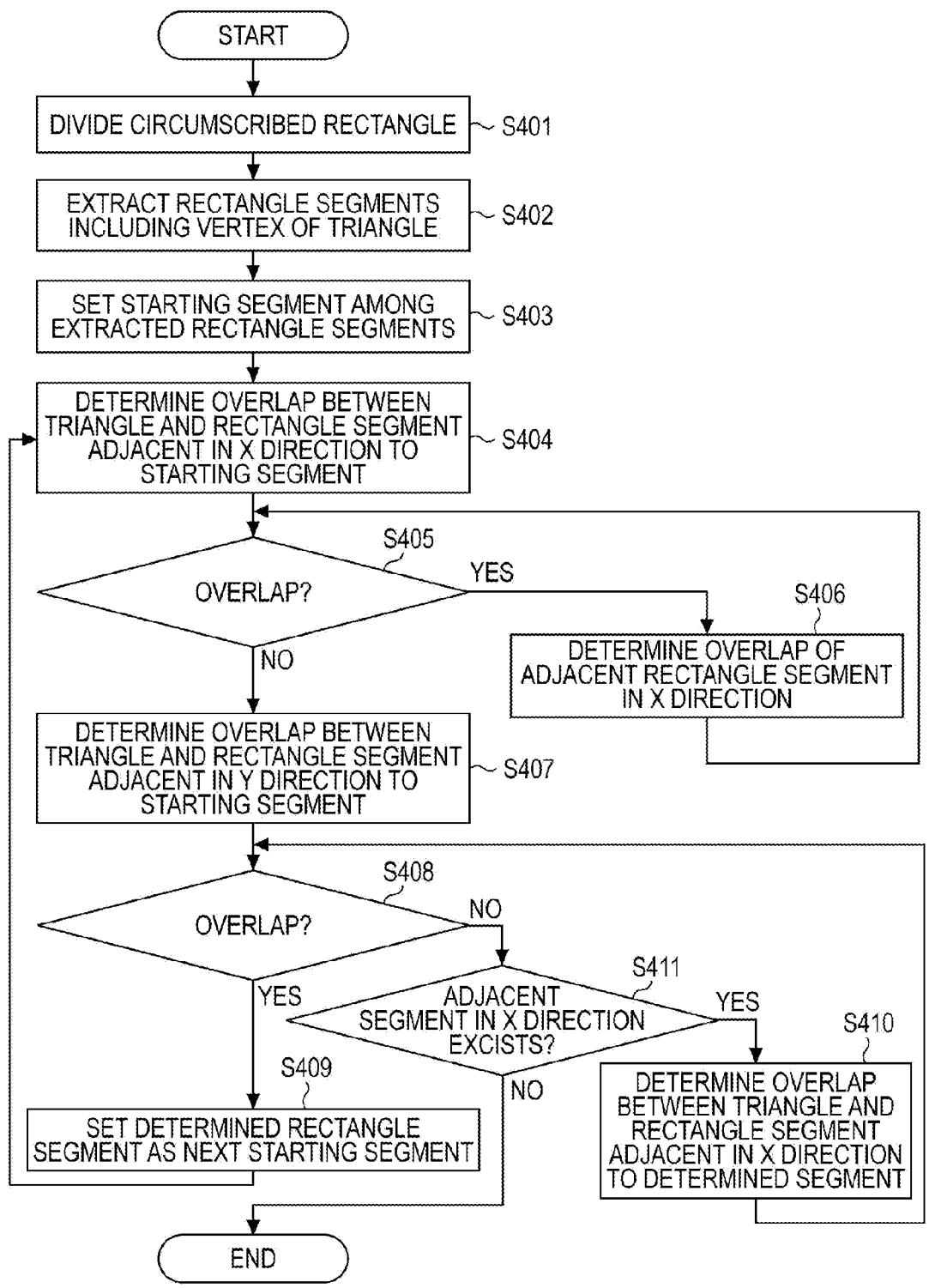
FIG. 4 is a flowchart illustrating a procedure of the drawing process according to the embodiment.

FIG. 4 is a flowchart illustrating a procedure of a determining process performed by the drawing apparatus according to the embodiment. With reference to this flowchart, a description is given about a process of setting a starting segment in rectangle segments constituting a rectangle circumscribing a triangle, determining whether each rectangle segment is a drawing target, and setting a next starting segment.

Referring to the flowchart illustrated in FIG. 4, the dividing unit 301 divides a rectangle circumscribing a triangle into rectangle segments (S401). Then, the extracting unit 302 extracts rectangle segments including a vertex of a triangle (S402), and the setting unit 303 sets a starting segment among the extracted rectangle segments (S403). After the starting segment has been set, a determining process on the rectangle segments is performed by the control unit 305 by using the starting segment as the reference.

The determining unit 304 determines overlap between a rectangle segment adjacent in the x direction to the starting segment and the triangle (S404). A determination result is obtained through the determination in S404 (S405). If the determination result is overlap (YES in S405), the determining unit 304 determines overlap between a rectangle segment adjacent to the rectangle segment that is a target of the determination in S404 (S406), and the process returns to S405, where a determination result of the determination in S406 is obtained. S406 is repeatedly performed until it is determined that a rectangle segment does not overlap the triangle (YES loop of S405).

If the determination result obtained in S405 is nonoverlap (NO in S405), the determining unit 304 determines overlap between a rectangle segment adjacent in the y direction to the starting segment and the triangle (S407). A determination result is obtained through the determination in S407 (S408). If the determination result is overlap (YES in S408), the setting unit 303 sets the determined rectangle segment as a next starting segment (S409), and the process ends.

If the determination result obtained in S408 is nonoverlap (NO in S408), the determining unit 304 determines whether adjacent segment in the x direction exists or not (S411), and if the determination result obtained in S411 is no (NO in S411), the process ends. If the determination result obtained in S411 is yes (Yes in S411), the determining unit 304 determines overlap between triangle and a rectangle segment adjacent in the x direction to the segment adjacent in the y direction to the starting segment (S410), and such determination is sequentially performed in relation to the adjacent rectangle segments in the x direction until a determination result of overlap is obtained in S408 (YES loop of S408). Then, if a determination result of overlap is obtained in S408, the setting unit 303 sets the determined rectangle segment as a next starting segment (S409), and the process continues.

Figure 5C:
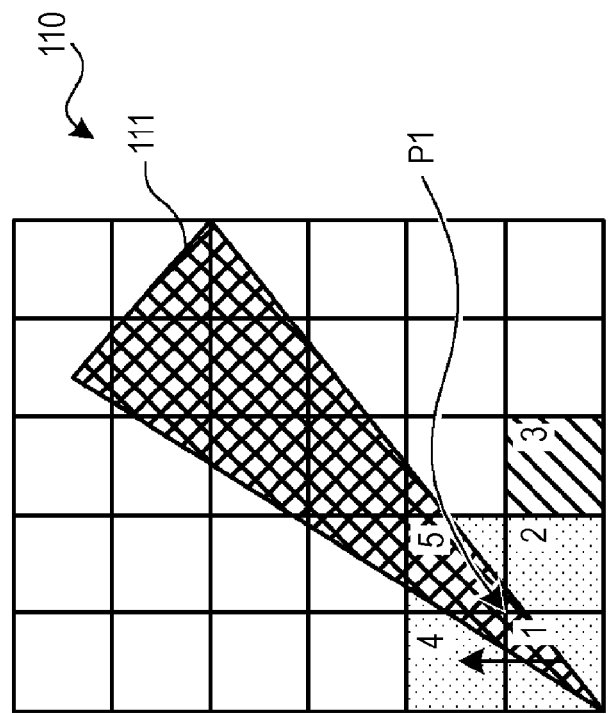

FIGS. 5A to 5F are illustrations of a tile determining operation in a tile scanning process. A starting tile to perform a tile determination is set for the triangle 111 in the rectangle 110 illustrated in FIG. 5A. The starting tile is a tile including a vertex of the triangle among four corner tiles (1) to (4) in FIG. 5A. In FIG. 5A, tile (2) is the starting tile.

The direction of the tile determining operation is decided depending on the tile set as the starting tile. When the starting tile is tile (1) in FIG. 5A, the operating directions are the right direction and the downward direction. When the starting tile is tile (2), the operating directions are the right direction and the upward direction. When the starting tile is tile (3), the operating directions are the left direction and the downward direction. When the starting tile is tile (4), the operating directions are the left direction and the upward direction.

Referring to FIG. 5B, determination is performed on the tiles in the right direction from starting tile 1 in order to determine a drawing target. Upper-right corner P1 of starting tile 1 is defined as a determining point and it is determined whether tile 2 on the right side of P1 includes the drawing area of the triangle 111. As can be seen in FIG. 5B, tile 2 on the right side of P1 includes the drawing area, and thus the determining process shifts to tile 2.

On the other hand, in the tile determining operation, whether a tile 502 on the upper side of P1 includes the drawing area of the triangle 111 is determined as in FIG. 5B. The tile 502 includes the drawing area and is thus set as a starting tile of an upper tile sequence.

Then, referring to FIG. 5C, it is determined whether tile 3 on the right of tile 2 includes the drawing area of the triangle 111. Tile 3 is outside the drawing area, and thus the tile determining operation in a first tile sequence (tiles 1, 2, and 3) ends.

Figure 5D:
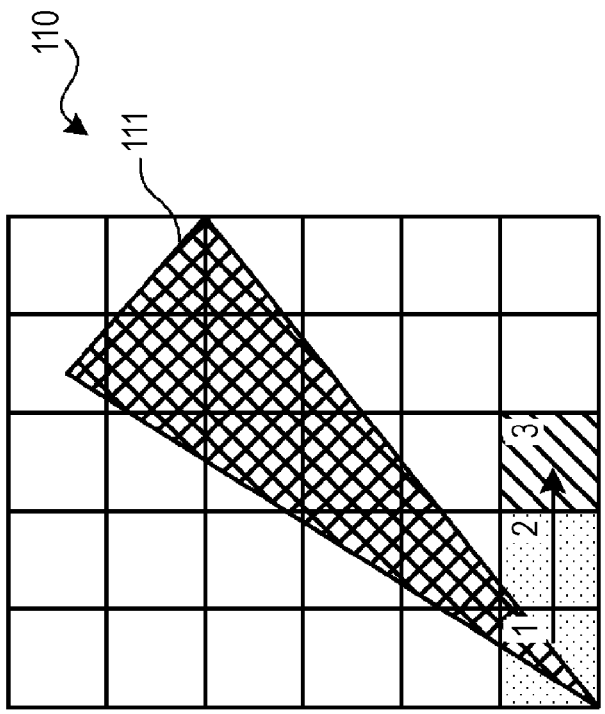

Referring to FIG. 5D, tile 4 as the starting tile of the upper tile sequence set in FIG. 5B is regarded as the reference and it is determined whether each tile is a drawing target in the right direction. Determination on tile 4 as the starting tile has been made, and thus determination is performed on tile 5. In this phase, it is determined whether lower-right corner P1 of tile 4 is included in the drawing area of the triangle 111. Since lower-right corner P1 is included in the drawing area, tile 5 is determined to be a drawing target.

Figure 5E:
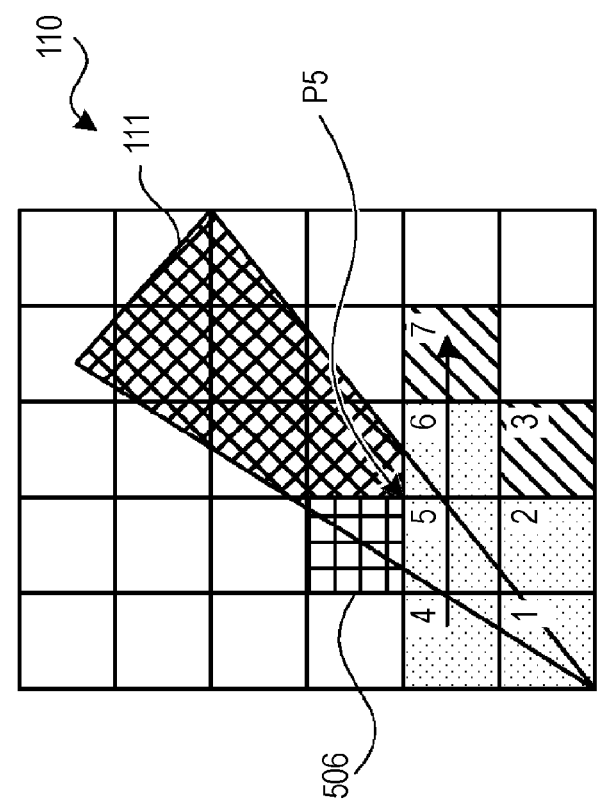

Then, referring to FIG. 5E, determination is performed on tile 5. Since tile 5 is a drawing target, determination is further performed. In tile 4, determination in the upward direction is also performed. Since the drawing area does not exist above tile 4, the determining process shifts in the upward direction of tile 5. Since upper-right corner P5 of tile 5 is included in the drawing area, tile 505 adjacent in the upward direction to tile 5 is set as a starting tile of an upper tile sequence.

Figure 5F:
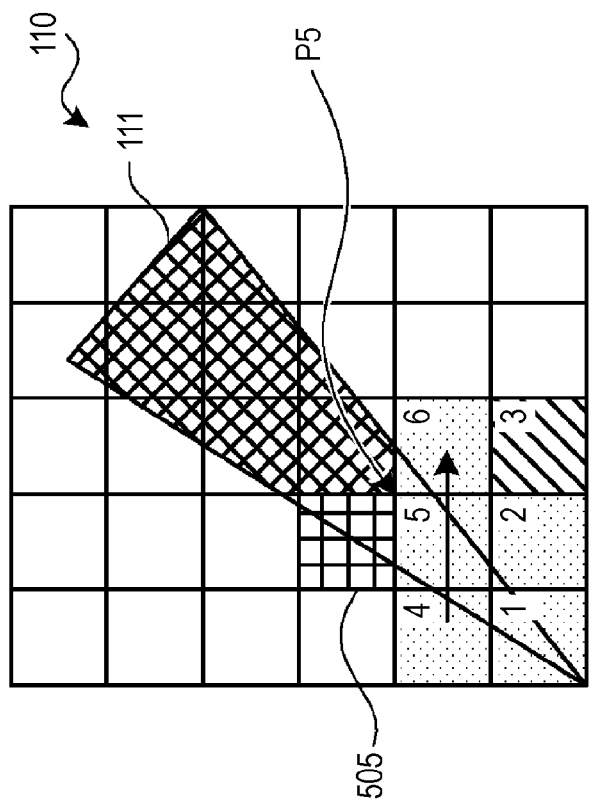

Referring to FIG. 5F, it is determined from the determination on tile 6 that tile 7 does not include the drawing area, and the tile determining operation in a second tile sequence (tiles 4, 5, 6, and 7) of the rectangle 110 ends. Then, the determining process restarts by using tile 506 newly set as the starting tile as the reference.

FIG. 6 is a block diagram of the drawing apparatus according to the embodiment. The drawing apparatus 600 illustrated in FIG. 6 includes an edge function calculating unit 610, a determining unit 620, and an inside-of-tile drawing unit 630.

The determining unit 620 includes a vertex sorting unit 621, a starting tile/scanning direction deciding unit 622, a starting tile holding register unit 623, a tile position determining unit 624, a tile sequence process discontinuation determining unit 625, and a next starting tile deciding unit 626.

The vertex sorting unit 621 receives coordinate information of each vertex of a triangle, sorts vertex information based on coordinates of each vertex, and outputs the vertex information to the starting tile/scanning direction deciding unit 622. The starting tile/scanning direction deciding unit 622 decides a starting tile and a scanning direction according to the starting tile on the basis of the vertex information and outputs the starting tile and the scanning direction to the starting tile holding register unit 623.

The starting tile holding register unit 623 holds the information about the starting tile and the scanning direction output from the starting tile/scanning direction deciding unit 622 in a predetermined register. The information stored in the starting tile holding register unit 623 is output to the tile position determining unit 624. The tile position determining unit 624 outputs the information about the starting tile received from the starting tile holding register unit 623 as positional information of a target tile to the inside-of-tile drawing unit 630, which is allowed to perform drawing in the starting tile. The information of the starting tile determined by the tile position determining unit 624 is input to the tile sequence process discontinuation determining unit 625 and the next starting tile deciding unit 626.

The starting tile information and an edge function representing the respective sides of the triangle calculated by the edge function calculating unit 610 are input to the tile sequence process discontinuation determining unit 625. The tile sequence process discontinuation determining unit 625 sequentially performs a determining process on the tiles of the tile sequence (group of tiles in a direction in a coordinate system, for example, a group of tiles in x direction as a target tile group) that is currently specified as a determination target. The tile sequence process discontinuation determining unit 625 determines a tile not overlapping the drawing area to be a tile where the determining process discontinues. After the tile sequence process discontinuation determining unit 625 has determined the tile where the determining process discontinues, a request for shifting the determining process to a next tile sequence is output to the tile position determining unit 624.

The starting tile information and the edge function calculated by the edge function calculating unit 610 are also input to the next starting tile deciding unit 626. The next starting tile deciding unit 626 decides a starting tile of a next tile sequence with reference to the tiles of the tile sequence that is currently specified as a determination target. Information of the starting tile of the next tile sequence decided by the next starting tile deciding unit 626 is output to the starting tile holding register unit 623. In the starting tile holding register unit 623, the starting tile position information is updated on the basis of the starting tile information input from the next starting tile deciding unit 626.

Then, the inside-of-tile drawing unit 630 draws a triangle by using triangle parameters including color and texture information, the edge function, and the positional information of the tiles as a drawing target. The drawn triangle is output to the output device, such as the display or the printer.

FIG. 7 is a flowchart illustrating a procedure of a drawing process according to the embodiment. In the flowchart illustrated in FIG. 7, the vertex sorting unit 621 calculates maximum and minimum values in the x and y directions of the respective vertices of the triangle (S701).

The starting tile/scanning direction deciding unit 622 sets, as a starting tile, a tile including the vertex having a maximum or minimum value in the x direction and a maximum or minimum value in the y direction (S702). In S702, four tiles including four corners having a maximum or minimum value in the x direction and a maximum or minimum value in the y direction are set.

A tile scanning order is decided in accordance with the position of the starting tile set in S702 (S703).

Then, among four points of the corners of the starting tile decided in S703, two points in the x scanning direction are set as x determination points (S704). For example, when the lower-left tile is set as the starting tile, the two points in the x scanning direction are the two points at the upper-right and the lower-right of the starting tile. Furthermore, among the four points of the starting tile, two points in the y scanning direction are set as y determination points (S705). The two points in the y scanning direction are the two points at the upper-left and the upper-right of the starting tile. The above-described process including S702 to S705 is performed by the starting tile/scanning direction deciding unit 622.

Then, a tile scanning process is performed by using the x determination points set in S704 and the y determination points set in S705 (S706).

Figure 8:
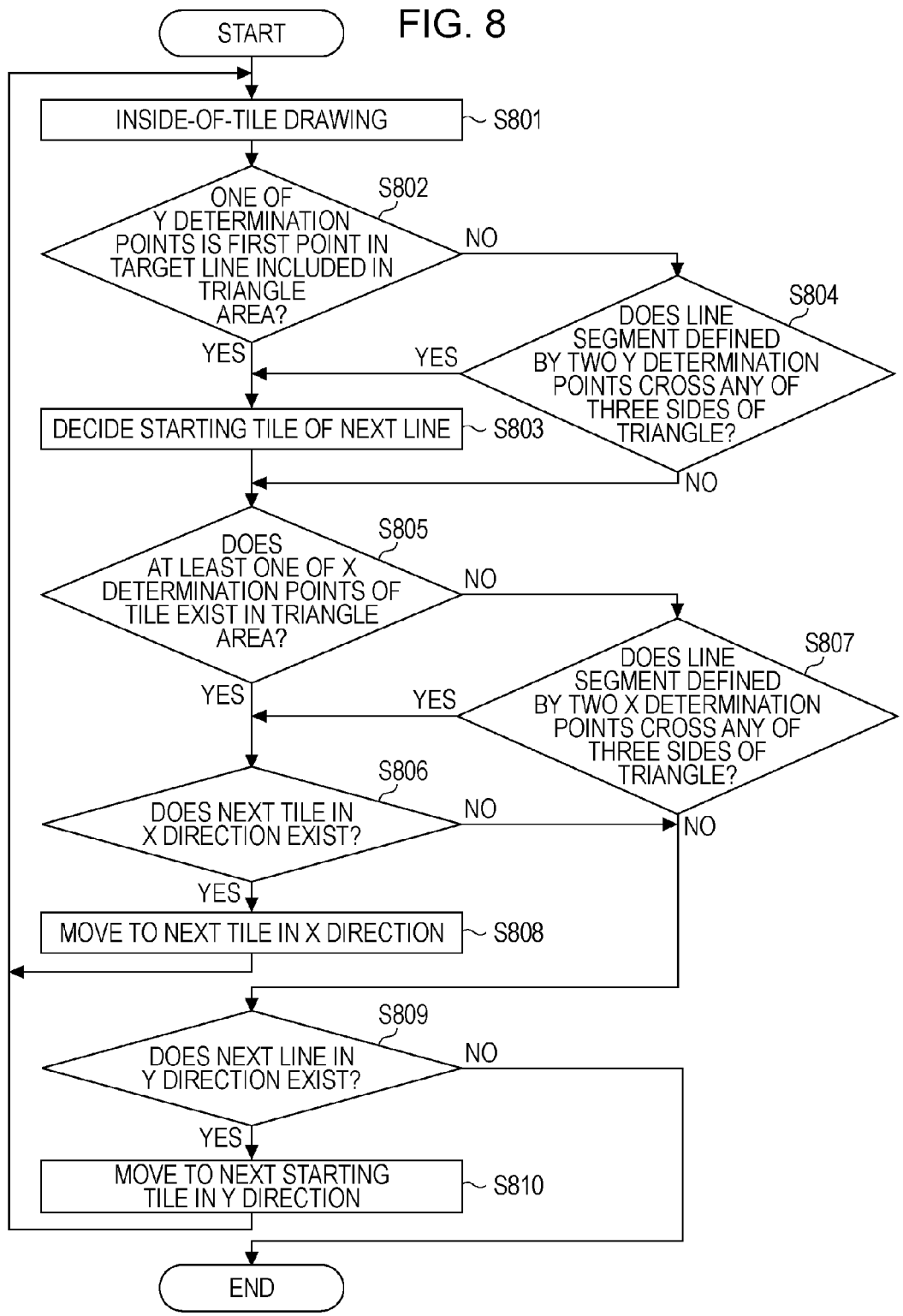
FIG. 8 is a flowchart illustrating a procedure of a tile scanning process in the drawing process according to the embodiment.

FIG. 8 is a flowchart illustrating a procedure of the tile scanning process in a three-dimensional drawing process. In the flowchart illustrated in FIG. 8, drawing in the tile that is currently being scanned is performed (S801).

The next starting tile deciding unit 626 determines whether one of the y determination points is a first point in a target line included in the triangle area (S802). As described above with reference to FIG. 7, the y determination points are points corresponding to the two corners in the y scanning direction among the four corners of the starting tile. If it is determined in S802 that any of the y determination points is included in the triangle area (YES in S802), a starting tile in the next line is decided on the basis of the y determination points used as a determination reference in S802 (S803).

If it is determined in S802 that any of the y determination points is not included in the triangle area (NO in S802), it is determined whether a line segment defined by the two y determination points crosses any of the three sides of the triangle (S804). If it is determined in S804 that the line segment crosses any of the three sides (YES in S804), the process proceeds to S803, a starting tile is decided. If it is determined in S804 that the line segment does not cross any of the three sides (NO in S804), the process skips to S805 without deciding a starting tile. The above-described process including S802 to S804 is performed by the next starting tile deciding unit 626.

A description is given about S804 of determining whether the line segment defined by the two y determination points crosses any of the three sides of the triangle. In order to determine the crossing between the line segment and each side of the triangle, information of coordinates V (x0, y0) and coordinates V' (x1, y1) of the respective two points among vertex coordinates of the triangle is obtained, and an edge function E=ax+by+c representing one of the sides of the triangle is generated on the basis of the coordinate values. Then, when the edge function and the y determination points (xj0, yj) and (xj1, yj) satisfy the condition of the following expressions (1) and (2), it is determined that the line segment crosses the side of the triangle.

$$y0<yj<y1\ (y0<y1) \tag{1}$$

$$E=a*x0+b*y0+cE'=a*x1+b*y1+c(E*E'=<0) \tag{2}$$

In FIG. 8, the tile sequence process discontinuation determining unit 625 determines whether at least one of the x determination points of the tile exists in the triangle area (S805). The tile as the determination target in S805 is the same as the tile in S802.

If it is determined in S805 that at least one of the x determination points exists in the triangle area (YES in S805), it is determined whether a next tile in the x direction exists (S806). If the next tile exists (YES in S806), the tile position determining unit 624 performs a process on the next tile in the x direction (S808). The above-described process including S805 to S807 is performed by the tile sequence process discontinuation determining unit 625.

If it is determined in S805 that both of the x determination points are outside the triangle area (NO in S805), it is determined whether the line segment defined by the two x determination points crosses any of the three sides of the triangle (S807). It is determined in S807 that the line segment crosses any of the three sides (YES in S807), the process proceeds to S806. If it is determined in S807 that the line segment does not cross any of the three sides (NO in S807), the process proceeds to S809, where it is determined whether a next line in the y direction exists (S809).

A description is given about S807 of determining whether the line segment defined by the two x determination points crosses any of the three sides of the triangle. In order to determine the crossing between the line segment and each side of the triangle, information of coordinates of the respective two points among vertex coordinates of the triangle is obtained, and an edge function E is generated on the basis of the coordinate values. Then, when the edge function E and the x determination points (xj, yj0) and (xj, yj1) satisfy the condition of the following expressions (3) and (4), it is determined that the line segment crosses the side of the triangle.

$$x0<xj<x1\ (x0<x1) \tag{3}$$

$$E=a*x0+b*y0+cE'=a*x1+b*y1+c(E*E'=<0) \tag{4}$$

Referring to FIG. 8, if it is determined in S809 that a next line in the y direction does not exist (NO in S809), the tile scanning process ends. On the other hand, after S808 ends or after S810 ends, the process returns to S801, and the tile scanning process starts by using a next starting tile as the reference. The above-described process including S808 to S810 is performed by the tile position determining unit 624.

In the above-described drawing process, a preliminary determining process is performed on only the tiles adjacent to the tiles as a drawing target among the tiles on which drawing is not actually performed. Thus, a process on the tiles on which drawing is not performed is significantly reduced compared to a conventional drawing process where a preliminary determining process is performed on all tiles.

In the above-described embodiment, the case of drawing a triangle is described. The drawing process according to the embodiment can also be performed on a plurality of triangles when a polygon can be divided into the plurality of triangles.

The drawing method according to the above-described embodiment can be realized by allowing a computer, such as a personal computer or a work station, to execute a prepared program. This program is recorded on a computer-readable recording medium, such as a hard disk, a flexible disk, a CD-ROM, an MO, and a DVD, and is executed by the computer by being read from the recording medium. Also, the program may provided by a transmission medium that can be distributed via a network, such as the Internet.

The drawing apparatus 200 according to the above-described embodiment can also be realized by a programmable logic device (PLD) including an application-specific integrated circuit (ASIC), such as a standard cell and a structured ASIC, and a filed-programmable gate array (FPGA). More specifically, the drawing apparatus 200 can be manufactured by functionally defining the function of the above-described apparatus 200 (enter each code of a functional block) by Hardware Description Language (HDL) and giving the HDL description to the ASIC or the PLD after logic synthesis.

According to an aspect of an embodiment, a computing apparatus in communication with a display screen includes a computer readable recording medium storing image data; and a computer processor programmed to execute a rasterizing process on the stored image data for drawing an image on the display screen by dividing a rectangle frame circumscribing a polygon for drawing the image into a plurality of rectangle segments; sequentially determining whether each rectangle segment included in the rectangle frame overlaps or nonoverlaps the polygon in a first direction and in a second direction orthogonal to the first direction until determining two immediately succeeding nonoverlappin rectangle segments; and rasterizing areas of the polygon included in the rectangle segments overlapping the polygon.

According to an aspect of the embodiments of the invention, any combinations of the described features, functions, operations, and/or benefits can be provided. The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be included/encoded in transmission communication media. An example of transmission communication media includes a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A drawing apparatus comprising:
a dividing unit dividing a rectangle frame circumscribing a triangle displayed on a display screen into a plurality of rectangle segments;
a determining unit sequentially performing a determining process of determining whether each rectangle segment included in the rectangle frame overlaps the triangle in a predetermined direction and outputting a determination result of overlap or nonoverlap;
a determination control unit ending the determining process in the predetermined direction if the determination result output from the determining unit changes from the overlap to the nonoverlap; and
drawing unit performing a drawing process on the rectangle segment determined to overlap the triangle by the determining unit,
wherein the determination control unit allows the determining unit to perform an orthogonal direction determining process of determining whether the triangle overlaps a rectangle segment adjacent to the rectangle segment determined to overlap the triangle in a direction orthogonal to the predetermined direction.

2. The drawing apparatus according to claim 1, further comprising:
an extracting unit extracting rectangle segments including a vertex of the triangle from the plurality of rectangle segments; and
a setting unit setting a rectangle segment positioned at a corner of the rectangle frame from among the extracted rectangle segments including the vertex as a starting rectangle segment from which the determining process starts.

3. The drawing apparatus according to claim 2, wherein the rectangle frame has a side parallel to a scanning direction of the display screen, and the predetermined direction corresponds to the scanning direction.

4. The drawing apparatus according to claim 2, further comprising:
an obtaining unit obtaining vertex coordinates of the triangle; and
a detecting unit detecting a vertex having maximum or minimum x and y values of the vertex coordinates, wherein the rectangle segment including the vertex having the maximum or minimum x and y values is set as the starting rectangle segment.

5. The drawing apparatus according to claim 2,
wherein the determining unit performs the orthogonal direction determining process after sequentially performing the determining process in the predetermined direction from the starting rectangle segment, and
wherein the setting unit sets, as a new starting rectangle segment, a rectangle segment determined first to overlap the triangle in the orthogonal direction determining process.

6. The drawing apparatus according to claim 5, wherein the determining unit starts, after the determining process in the predetermined direction, a determining process in the predetermined direction from the rectangle segment newly set as a starting rectangle segment by the setting unit.

7. The drawing apparatus according to claim 1, wherein the dividing unit divides the rectangle frame into the plurality of rectangle segments in units of pixel blocks of the display screen.

8. A non-transitory computer-readable recording medium storing a drawing program that causes a computer to perform operations comprising:
dividing a rectangle frame circumscribing a triangle displayed on a display screen into a plurality of rectangle segments;
sequentially performing a determining process of determining whether each rectangle segment included in the rectangle frame overlap the triangle in a predetermined direction;
ending the determining process if a determination result changes from overlap to nonoverlap;
performing a drawing process on the rectangle segment determined to overlap the triangle; and
performing an orthogonal direction determining process of determining whether the triangle overlaps on a rectangle adjacent to the rectangle segment determined to overlap the triangle in a direction orthogonal to the predetermined direction.

9. The non-transitory computer-readable recording medium according to claim 8, the operations further comprising: extracting rectangle segments including a vertex of the triangle from the plurality of rectangle segments; and
setting the rectangle segment positioned at a corner of the rectangle frame from among the extracted rectangle segments including the vertex as a starting rectangle segment from which the determining process starts.

10. The non-transitory computer-readable recording medium according to claim 9, the operations further comprising:
setting, as a new starting rectangle segment, a rectangle segment determined first to overlap the triangle in the orthogonal direction determining process.

11. The non-transitory computer-readable recording medium according to claim 10, the operations further comprising:
starting, after the determining process in the predetermined direction, a determining process in the predetermined direction from the rectangle segment newly set as the starting rectangle segment.

12. The non-transitory computer-readable recording medium according to claim 8, wherein, the dividing of the rectangle frame circumscribing the triangle divides the rectangle frame into the plurality of rectangle segments in units of pixel blocks of the display screen.

13. A computer implemented drawing method comprising:
dividing a rectangle frame circumscribing a triangle displayed on a display screen into a plurality of rectangle segments, based upon image data stored in a computer readable recording medium;
determining whether each rectangle segment included in the rectangle frame overlap the triangle in a predetermined direction, based upon the image data coordinate information of the rectangle and the triangle stored in the computer readable recording medium;
ending the determining process if a determination result in the determining process changes from overlap to nonoverlap after the determining process has started;
displaying on a computer display an area of the triangle included in a rectangle segment determined to overlap the triangle in the determining process; and
performing an orthogonal direction determining process of determining whether the triangle overlaps on a rectangle segment adjacent to the rectangle segment determined to overlap the triangle in a direction orthogonal to the predetermined direction.

14. The drawing method according to claim 13, further comprising:
extracting the rectangle segments including a vertex of the triangle from the plurality of rectangle segments; and
setting the rectangle segment positioned at a corner of the rectangle frame from among the extracted rectangle segments including the vertex as a starting rectangle segment from which the determining process starts.

15. The drawing method according to claim 13, further comprising:

ending the orthogonal direction determining process if the determination result changes from overlap to nonoverlap after the orthogonal direction determining process has started.

16. The drawing method according to claim 15,
wherein the determining process performs determining in the predetermined direction and in the orthogonal direction from the starting rectangle segment, and
wherein the setting process sets, as a new starting rectangle segment, a rectangle segment determined first to overlap the triangle in the orthogonal direction determining process.

17. The drawing method according to claim 16, wherein the determining process performs, after the determining process in the predetermined direction has ended, a determining process in the predetermined direction from the rectangle segment newly set as a starting rectangle segment in the setting process.

18. The drawing method according to claim 13, wherein the dividing process divides the rectangle frame into the plurality of rectangle segments in units of pixel blocks of the display screen.

19. A computing apparatus in communication with a display screen, comprising:

a computer readable recording medium storing image data; and a computer processor programmed to execute a rasterizing process on the stored image data for drawing an image on the display screen by:

dividing a rectangle frame circumscribing a polygon for drawing the image into a plurality of rectangle segments;

sequentially determining whether each rectangle segment included in the rectangle frame overlaps or non-overlaps the polygon in a first direction and in a second direction orthogonal to the first direction until determining two immediately succeeding nonoverlapping rectangle segments by performing an orthogonal direction determining process of determining whether the polygon overlaps on a rectangle segment adjacent to the rectangle segment determined to overlap the polygon in a second direction orthogonal to the first direction; and rasterizing areas of the polygon included in the rectangle segments overlapping the polygon.

* * * * *